(No Model.)

C. F. PARKER.
TRAP.

No. 411,606. Patented Sept. 24, 1889.

Witnesses:
Myrtie C. Beals.
Mary A. Goodale.

Inventor.
Charles F. Parker,
By Albert M. Moore,
His Attorney.

UNITED STATES PATENT OFFICE.

CHARLES F. PARKER, OF LOWELL, MASSACHUSETTS.

TRAP.

SPECIFICATION forming part of Letters Patent No. 411,606, dated September 24, 1889.

Application filed December 23, 1886. Serial No. 222,413. (No model.)

*To all whom it may concern:*

Be it known that I, CHARLES F. PARKER, a citizen of the United States, residing at Lowell, in the county of Middlesex and State of Massachusetts, have invented a new and useful Improvement in Traps, of which the following is a specification.

My invention relates to that class of traps in which animals are caught by means of jaws actuated by steel springs; and the objects of my improvements are to provide a trap which may be suspended and present the bait apparently free from obstruction and which will act effectively when the trigger is released by being reached from either side, and which may be readily changed from a high-tension to a low-tension spring.

Figure 1:
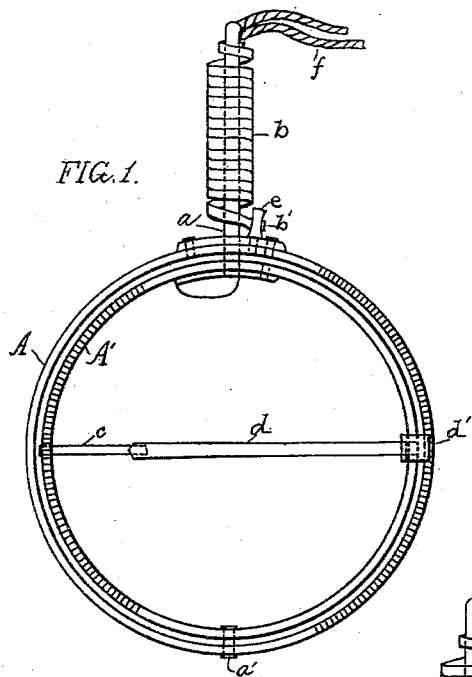
Figure 2:
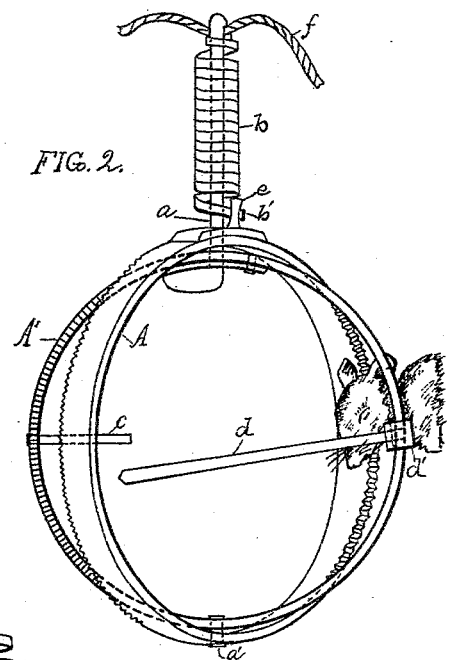

In the drawings, Figure 1 is an elevation of the trap when set. Fig. 2 represents the trap in act of closing upon the neck of an animal; and Fig. 3, a modified form of the trap adapted for catching birds, in which the jaws are covered with netting and represented about half closed.

The jaws A and A' are constructed in the form of rings, the ring A' being smaller in diameter than the ring A, to allow it to be rotated within the said ring A upon the axis formed by the spindle $a$ and the pivot $a'$. The said parts $a$ and $a'$ are riveted or otherwise made fast to the ring A', and have their bearings in holes drilled in the ring A, through which they project.

To the upper end of the spindle $a$, I make fast one end of the spiral spring $b$, which is coiled around the said spindle $a$ and terminates in a hook $b'$, and thereby engages with the stud $e$, which projects from the outer circumference of the ring A at a point suitably near to the spindle $a$. It will therefore readily be seen that by revolving the ring or jaws A' in the proper direction (A being held stationary) the spring $b$ may be wound up to a tension corresponding to the number of revolutions given to the spindle $a$.

A short stud or catch $c$ projects from the inner surface of the ring A', and at a point diametrically opposite the trigger $d$ is hinged or loosely riveted to said ring A', the inner arm of said trigger being, preferably, a wire or comparatively slender bar. To set the trap, a bait is attached to the middle of the trigger, the spring wound up in the manner hereinbefore described, and the long end of the trigger locked against the catch $c$, when the short, flat part of the trigger $d'$ will lap onto the jaw or ring A and hold the jaws against the tension of the spring, as shown in Fig. 1. When set and suspended by the cord $f$, the trap presents the appearance of a single ring, with the bait in its center, upon a bar or wire; and it is therefore specially adapted for catching fish and birds.

When the trigger $d$ is released from the catch $c$, as shown in Fig. 2, the uncoiling of the spring $b$ causes the jaws to revolve in opposite directions and close upon whatever is in their path of revolution.

Figure 3:
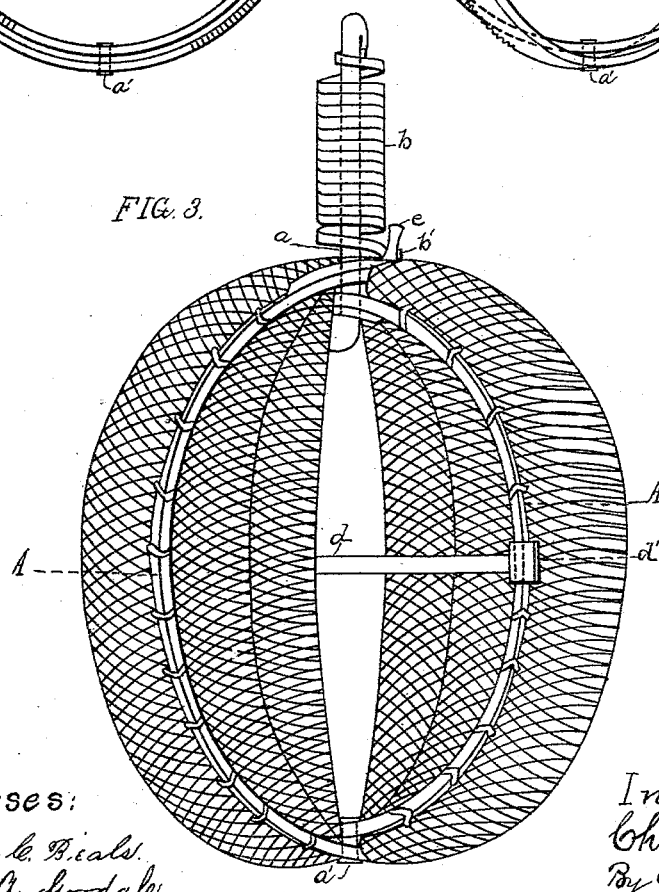

The trap may be suspended by the cord or chain $f$, or may be laid on its side and covered with loose material in the usual way, in which case it is effective whether the animal springs it from the top or digs under the trap, as foxes sometimes do to get the bait. It may also be constructed of light material of a suitable size and the jaws covered with a circular piece of netting, one side of each piece of netting attached to the ring A and the other to the ring A', and thereby adapted to catch birds. This modified form is shown in Fig. 3.

I hereby disclaim a trap provided with a pair of rings actuated by a spring, as described in patent granted to H. S. Frost, No. 120,375, October 31, 1871.

Having thus fully described my invention, what I claim, and desire to secure by Letters Patent, is—

A trap having jaws in the form of rings, pivoted one within the other at diametrically-opposite points, one of said pivots being a spindle secured to said inner ring and projecting through said outer ring, a spiral spring surrounding said spindle outside of said rings and secured at one end to said spindle and at the other end to said outer ring, a catch projecting inward from said inner ring, and a trigger or bar hinged to said inner ring opposite said catch and extending outward to engage said outer ring and inward to engage said catch, as and for the purpose specified.

CHARLES F. PARKER.

Witnesses:
HENRY A. DAVIS,
LEONARD H. DAVIS.